(12) United States Patent
Konieczka

(10) Patent No.: US 7,959,054 B2
(45) Date of Patent: Jun. 14, 2011

(54) DEVICE FOR PROCESSING WORKPIECES USING ULTRASOUND

(75) Inventor: Mike Konieczka, McHenry, IL (US)

(73) Assignee: Hermann Ultraschalltechnik GmbH, Karlsbad-Ittersbach (DE)

( * ) Notice: Subject to any disclaimer, the term of this patent is extended or adjusted under 35 U.S.C. 154(b) by 216 days.

(21) Appl. No.: 11/723,214

(22) Filed: Mar. 19, 2007

(65) Prior Publication Data

US 2007/0251978 A1   Nov. 1, 2007

(30) Foreign Application Priority Data

Apr. 26, 2006 (DE) .................. 10 2006 020 418

(51) Int. Cl.
*B23K 1/06* (2006.01)
(52) U.S. Cl. .................. 228/1.1; 228/110.1
(58) Field of Classification Search .......... 228/110.1, 228/1.1; 156/73.3, 73.1
See application file for complete search history.

(56) References Cited

U.S. PATENT DOCUMENTS

| 3,038,358 | A | * | 6/1962 | Jones | 228/1.1 |
| 3,464,102 | A | * | 9/1969 | Soloff | 156/580.2 |
| 3,526,554 | A | * | 9/1970 | Obeda | 156/73.1 |
| 3,628,716 | A | | 12/1971 | Fastre | |
| 3,697,357 | A | | 10/1972 | Obeda | |
| 4,995,938 | A | * | 2/1991 | Tsutsumi | 156/580.1 |
| 5,669,545 | A | * | 9/1997 | Pham et al. | 228/1.1 |
| 6,309,490 | B1 | * | 10/2001 | Davis et al. | 156/73.3 |
| 6,521,067 | B1 | * | 2/2003 | Clark | 156/73.1 |
| 6,616,031 | B2 | * | 9/2003 | Wong et al. | 228/102 |
| 2002/0030089 | A1 | * | 3/2002 | Leu | 228/248.1 |
| 2006/0255091 | A1 | * | 11/2006 | Reatherford et al. | 228/1.1 |

FOREIGN PATENT DOCUMENTS

| DE | 36 03 627 | 4/1987 |
| DE | 87 02 983 | 8/1988 |
| EP | 0 384 821 | 8/1990 |
| EP | 1 468 794 | 10/2004 |
| GB | 2 320 906 | 7/1998 |

* cited by examiner

*Primary Examiner* — Roy King
*Assistant Examiner* — Michael Aboagye
(74) *Attorney, Agent, or Firm* — Paul Vincent

(57) ABSTRACT

A device for processing workpieces using ultrasound, comprising an ultrasound sonotrode and an anvil, wherein a workpiece is processed between the ultrasound sonotrode and the anvil, the ultrasound sonotrode having a recess with open edges in the axial direction and a die is disposed in the recess in the direction towards the workpiece and/or the anvil, the die being displaceable between a rest position retracted into the ultrasound sonotrode and an operating position in which it partially projects out of the ultrasound sonotrode.

14 Claims, 1 Drawing Sheet

DEVICE FOR PROCESSING WORKPIECES USING ULTRASOUND

This application claims Paris Convention priority of DE 10 2006 020 418.2 filed Apr. 26, 2006 the complete disclosure of which is hereby incorporated by reference.

BACKGROUND OF THE INVENTION

The invention concerns a device for processing workpieces using ultrasound, comprising an ultrasound sonotrode and an anvil, wherein a workpiece is processed between the ultrasound sonotrode and the anvil.

Ultrasound processing devices of this type join or connect workpieces. Such devices also weld or separate, i.e. cut, workpieces. These devices may also be used to fix a first workpiece part to a second workpiece part at a certain position. In such processing workpieces, certain workpiece areas must often be protected from the ultrasound. Certain individual components which must not be welded to each other, must e.g. be fixed, held or damped. Moreover, the components should also be reliably fixed prior to processing.

Flexible mold parts are conventionally used, which are glued into or clamped to the sonotrode front ends to damp certain component areas during processing. Such damping elements, however, do not permit precise fixing. The service life of these elements is also relatively short and matching of the pressure is highly problematic due to the high spring constant or the short spring length of such damping elements.

In addition to prior art in accordance with DE-A-25 08 175, DE-A-10 68 646 and GB-A-1 262 534, DE-U 92 12 560 discloses spring-supported, leading holding-down devices which are supported and guided outside of the sonotrode. They may be pressed onto the workpiece to be processed outside of the sonotrode, or the holding-down devices are guided to the inside of the sonotrode as is disclosed in DE-U-87 02 983. The disadvantage of such designs is that the structure is relatively complex and requires a substantially large amount of space. Moreover, these systems are also pretensioned by mechanical springs. The pressure is therefore not constant and depends on the path.

In other embodiments, the holding-down device, which is pretensioned by a spring, is disposed in the oscillation node of the ultrasound sonotrode. These devices are problematic in that oscillations are still transmitted and exact bearing at the oscillation node is only theoretically possible, since the entire screwed joint or mounting of such a holding-down system extends over a larger area, beyond the oscillation node. This results in heating, vibrations and an increase in power loss of the overall system, which reduces the service life and limits the reliability of such systems.

It is therefore the underlying purpose of the invention to further develop a device of the above-mentioned type in such a fashion that the ultrasound sonotrode can be provided with a holding-down device or a damping element of simple and compact construction.

SUMMARY OF THE INVENTION

In accordance with the invention, this object is achieved in a device of the above-mentioned type in that the ultrasound sonotrode has a recess with open edges in the longitudinal axial direction towards the workpiece and/or the anvil. A die is disposed in the recess and can be moved between a rest position, withdrawn in the ultrasound sonotrode, and an operating position partially protruding from the sonotrode.

In accordance with the inventive design, the holding-down device or the damping element is designed as a die, a bolt or a plunger which is integrated in the ultrasound sonotrode, wherein the die may assume a rest position and an operating position by moving it within the recess. The function of the die can thus be switched on and off. In one variant, the die may also be fixed within the ultrasound sonotrode, such that it forms part of the oscillating ultrasound sonotrode and contributes to processing of the workpiece.

In a further development, the recess is a bore, in particular, a stepped bore with a circular or polygonal cross-section. The die may thereby be simply formed as a straight pin. When the die should maintain a certain orientation, it is provided with a polygonal cross-section, such that it can only be moved in one dimension, i.e. in its longitudinal direction. Should the straight pin have a shoulder, the travel of the die can be limited such that it can only be extended or fed out of the ultrasound sonotrode by a certain amount.

Optimum welding results are obtained when the die is guided in the recess without play or with minimum play. In addition, the die is disposed in a fluid-tight, in particular, pneumatically tight fashion in the recess and can be displaced like a piston using a fluid.

In one embodiment, the recess forms a pressure space and has a connection for a working fluid. The die is moved in the recess by the working fluid, and forces may be exerted on the die. The force acting onto the die and thereby the force of the holding-down device or the damping element may thereby be precisely adjusted by the fluid pressure.

In a preferred fashion, the connection for the working fluid is located at an oscillation node. A different position is also possible when the connection is vibrationally decoupled through suitable measures, in particular, elastic connections.

The connection thereby leads to a fluid source and/or a pressure sensor, in particular, a pressure controller. In this fashion, the die can be moved from the rest position into the working position and back, while also providing and even keeping the desired holding force at a constant value, irrespective of the position of the die in the recess.

In a particularly preferred embodiment, the holding force is selected to be smaller than the supply force of the ultrasound sonotrode. When the ultrasound sonotrode is disposed onto the workpiece, the die is initially supported on the workpiece and serves as a holding-down device for the workpiece, and is then pressed into the ultrasound sonotrode during the further feed motion of the ultrasound sonotrode towards the workpiece. The holding force thereby remains constant. As soon as the sonotrode abuts the workpiece, the holding force can be reduced to zero or the die can be completely retracted into the sonotrode.

It is also possible to extend the die again during or after processing of the workpiece using the ultrasound sonotrode, thereby performing a punching process. The die is then not only a holding-down device but also a punching tool.

The contact surface of the die may also preferably be structured such that the workpiece is reliably held. The die may be made from any material, such as metal, plastic material, ceramic or combinations thereof.

Further advantages, features and details of the invention can be extracted from the following description which explains in detail a particularly preferred embodiment with reference to the drawing. The features shown in the drawing and mentioned in the claims and the description may thereby be essential to the invention either individually or collectively in arbitrary combination.

DESCRIPTION OF THE PREFERRED EMBODIMENT

Figure 1:
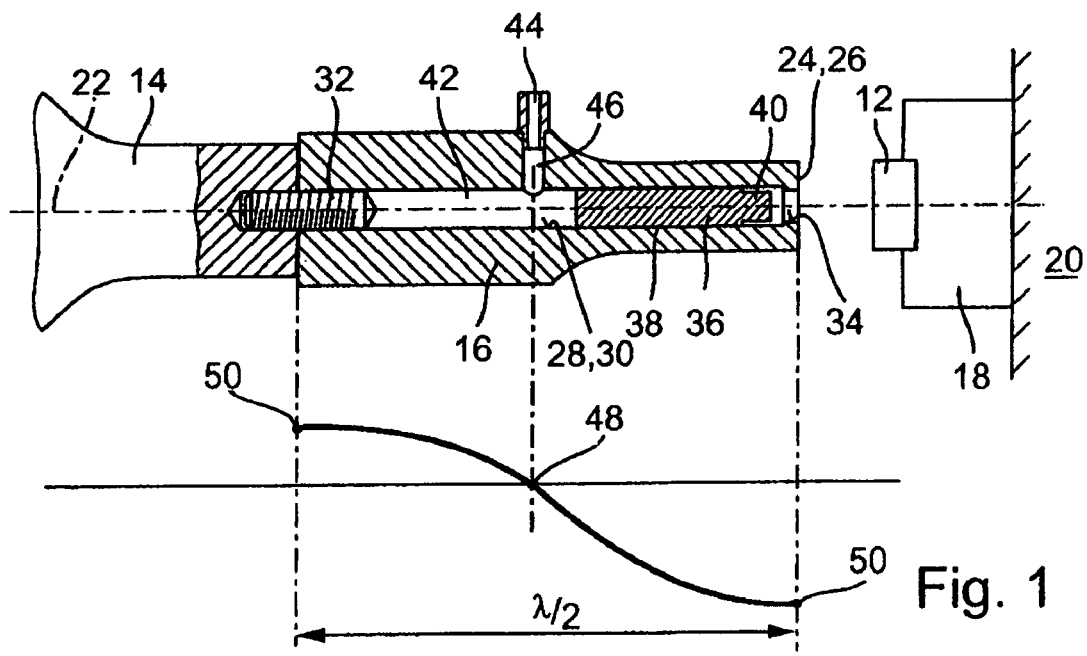
FIG. 1 shows a longitudinal section through the inventive device before disposition onto a workpiece.

FIG. 1 shows a device, designated in total with reference numeral 10, for processing a workpiece 12, having a booster or converter 14, an ultrasound sonotrode 16 and with an anvil 18, which is fixed to an indicated machine frame 20. The booster 14, the ultrasound sonotrode 16, the workpiece 12 and the anvil 18 are disposed along an axis 22, in particular, the longitudinal axis of the ultrasound sonotrode 16, which also represents the processing direction. The ultrasound sonotrode 16 has a front end 24 which represents the processing surface or welding surface 26 and which faces the workpiece 12.

The ultrasound sonotrode 16 has a recess which is designated in total with 28, and is designed e.g. as a bore 30 having a circular cross-section. The recess 28 has an open edge at the front end 24, i.e. it terminates into the open, wherein a stud 32 is screwed into the opposite side, to which the booster 14 is also connected.

Figure 2:
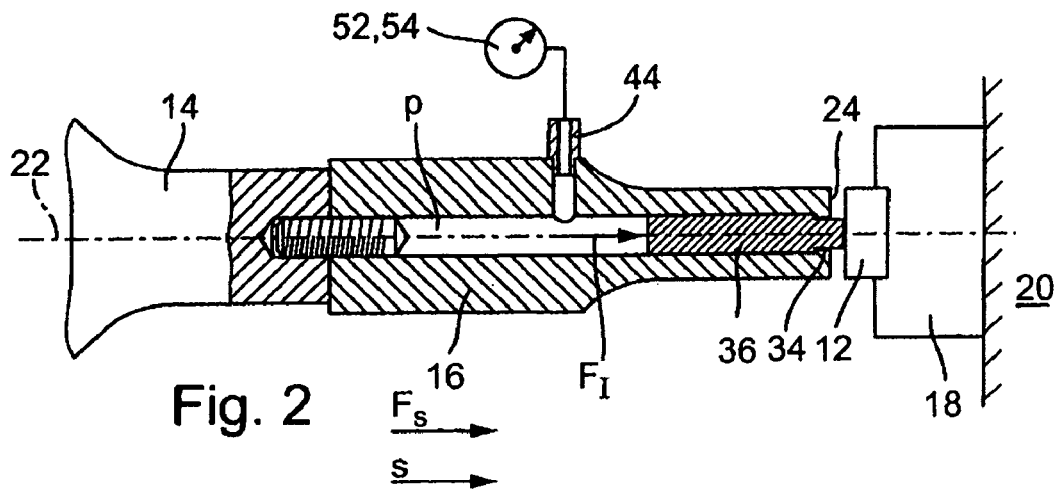
FIG. 2 shows the device in accordance with FIG. 1 during disposition onto the workpiece.

The recess 28 also extends in the direction of the axis 22 and is coaxial thereto. The recess 28 is moreover designed as a stepped bore and has a contraction 34 in the area of the front end 24. A die 36 is moreover disposed in the recess 28 and is displaceable in the direction of the axis 22 to assume its rest position in the location shown in FIG. 1. The area 38 of the recess 28 that adopts the die 36 may thereby have a circular or a polygonal cross-section. Moreover, the die 36 has a tapering end 40 which is dimensioned such that it can penetrate through the contraction 34 and project out of the ultrasound sonotrode 16, as is shown in FIG. 2. The tapering 34 thereby serves as an end stop for the die 36 which then assumes its operating position (FIG. 2).

A pressure chamber 42 is provided on the opposite side of the die 36, which has a connection 44 that terminates in the pressure chamber 42 via a cross hole 46. The connection 44 is located in the oscillation node 48 of the ultrasound sonotrode 16, the latter having an oscillation maximum 50 both at the front end 24 and on the opposite connecting side for the booster 14. This is clearly shown in the diagram of a half wave of λ/2 shown below the cross-section.

A pressure medium, e.g. a fluid, which may be a liquid or a gas, may be introduced via the connection 44 into the pressure chamber 42, thereby moving the die 36 towards the workpiece 12 and partially out of the ultrasound sonotrode 16 (see FIG. 2). The ultrasound sonotrode 16 is subsequently moved together with the booster 14 in the direction of travel S until the end 40 of the die 36 abuts the workpiece 12. There is a constant pressure in the pressure chamber 42, which is detected by a pressure sensor 52 that is also connected to the connection 44. The workpiece 12 is held by the end 40 of the die 36, such that the die 36 serves as a holding-down device.

Figure 3:
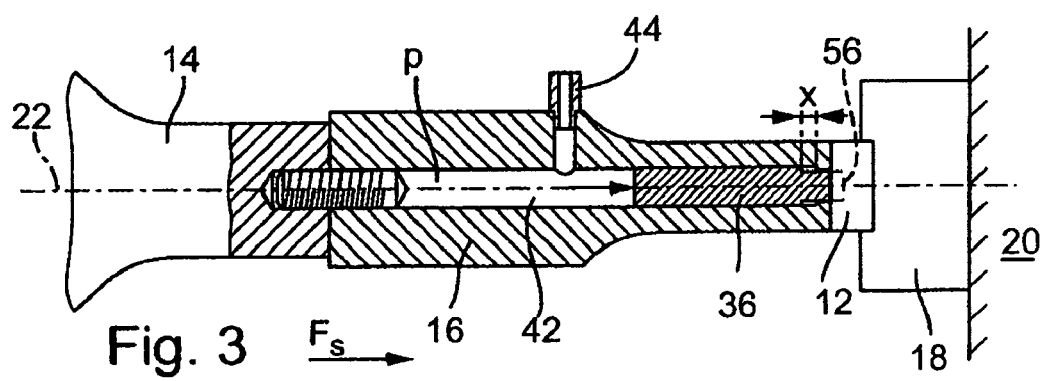
FIG. 3 shows the device in accordance with FIG. 1 during processing of the workpiece.

The ultrasound sonotrode 16 is then moved further towards the workpiece 12 through the distance X until the front end 24 abuts the surface of the workpiece 12 (see FIG. 3). The die 36 is thereby pushed back into the recess 28 against the holding force $F_I$ since the supply force $F_S$ of the sonotrode 16 is larger. The workpiece 12 is held due to the pressure P that prevails in the pressure chamber 42. This pressure P remains constant even when the die 36 is pushed back into the recess 28, since the pressure sensor 52 is connected to a pressure controller 54, which keeps the pressure P constant.

As soon as the front end 24 is supported on the workpiece 12, the workpiece is processed. The area of the workpiece 12 covered by the end 40 of the die 36 is not processed, since the die 36 does not follow the ultrasound oscillations of the ultrasound sonotrode 16. This area is designated on the workpiece 12 with 56.

The die 36 thus serves to fix the workpiece 12 and damp ultrasound oscillations in the area 56 on the workpiece 12. The die 36 may thereby also be designed as a punching tool, such that the workpiece 12 is punched by the die 36 before or after ultrasound processing by increasing the pressure P in the pressure chamber 42. The die 36 is disposed in the recess 28 free of play and can be displaced therein, in particular, in a fluid-tight fashion.

I claim:

1. A device for processing a workpiece using ultrasound, the workpiece being disposed between the device and an anvil, the device comprising:
   an ultrasound sonotrode having an end facing the workpiece and the anvil, said sonotrode having inner walls defining an axial recess with an opening disposed in said end of said sonotrode; and
   a die disposed in said recess to slide directly on said inner walls, said die being pneumatically driven into an operating position in which said die penetrates through said opening to partially project out of said ultrasound sonotrode, wherein, in a rest position, said die is completely retracted within said ultrasound sonotrode and said sonotrode end seats on the workpiece, wherein said sonotrode and said die are disposed, structured and dimensioned such that said die does not follow ultrasound oscillations in said sonotrode.

2. The device of claim 1, wherein said recess is a bore.

3. The device of claim 2, wherein said bore is a stepped bore.

4. The device of claim 1, further comprising stop means to delimit a displacement path of said die.

5. The device of claim 1, wherein said recess has a circular cross-section.

6. The device of claim 1, wherein said recess has a polygonal cross section.

7. The device of claim 1, wherein said die is disposed in said recess in a fluid-tight or pneumatically tight fashion.

8. The device of claim 1, wherein said recess forms a pressure chamber and has a connection for a fluid.

9. The device of claim 8, wherein said connection is disposed at an oscillation node.

10. The device of claim 8, wherein said connection leads to a fluid and/or pressure sensor.

11. The device of claim 10, further comprising a pressure sensor and a pressure controller communicating with said pressure sensor.

12. The device of claim 1, wherein said ultrasound sonotrode has a supply force which exceeds a force pressing said die out of said recess.

13. The device of claim 1, wherein a surface of said die which contacts the workpiece is structured.

14. The device of claim 1, wherein said die is formed as a punching tool.

* * * * *